3,377,349
PREPARATION OF MELAMINE
Samuel William Tribit, Hawthorne, N.Y., assignor to American Cyanamid Company, Stamford, Conn., a corporation of Maine
No Drawing. Filed July 22, 1965, Ser. No. 474,165
5 Claims. (Cl. 260—249.7)

ABSTRACT OF THE DISCLOSURE

Melamine is produced by thermally decomposing urea in a first, fixed, catalyst-free bed of inert, solid particles and thereafter, in a second bed, reactively contacting the resulting decomposition products with a catalyst effective to produce melamine.

---

This invention relates to a process for the production of melamine.

U.S. Patent 3,152,128 to Steggerda discloses a process for continuously producing melamine comprising thermally decomposing urea in a first, catalyst-free, fluidized bed of inert, solid particles such as sand and thereafter passing the gaseous products through a second bed containing catalyst for conversion to melamine. The process is said to provide increased economy since the use of non-catalytic material in the first bed permits 10 to 50% savings in catalyst. Moreover, the process has the advantage that the greatest endotherm of the reaction is supplied outside the catalyst bed, thus avoiding overheating the catalyst and plugging it with urea.

In accordance with the present invention, a process for the production of melamine has been discovered which not only realizes the catalyst economy of the aforementioned process but also provides additional advantages as described hereinafter.

Broadly, the process comprises thermally decomposing urea in a first, fixed, catalyst-free bed of inert, solid particles and thereafter, in a second bed, reactively contacting the resulting decomposition products with a catalyst effective to produce melamine.

A critical difference from the process of U.S. Patent 3,152,128 is the use in the instant process of a fixed bed in the non-catalyzed thermal decomposition step. It has been found that a fixed bed permits injection of either solid or liquid urea into the first bed with substantially equivalent ease. In contrast, smooth operation of a fluidized bed process employing liquid urea is uncertain since the particles of the bed tend to agglomerate, particularly in a small scale reactor. The result is plugging of the reactor, particularly at the urea injection point where often there is insufficient heat to vaporize the urea as in other areas of the reactor. To remedy this defect, expensive liquid urea injection means, such as pneumatic atomizing nozzles, are required. The first fixed bed of the present process avoids the need for such expensive injection means when liquid urea is employed, although these may be used if desired.

The feasibility of employing liquid urea in a fixed bed according to the present process has several important advantages. As is known in the art, the injection means available for solids such as urea are very limited and must be specifically engineered according to particle size and composition. Thus, solid urea is extremely sensitive to traces of moisture and will easily ball up in the reservoir if the injector in any way permits the entry of moisture. When liquid urea can be used, however, choice of injection means is not critical and in fact, a wide variety of such devices is available, e.g., displacement or flow meters, centrifugal pumps, gear pumps, piston pumps, bellows pumps and the like.

Another advantage of the instant process is the greater capability of the first, fixed, bed to retain in the reactor the heat required for the endothermic first step. Moreover, the desired temperature can be more easily maintained throughout the reactor and particularly at the point of urea injection, thereby avoiding agglomeration.

The process has the further advantage that expensive and complex heat exchanger designs of the first stage reactor may be avoided since the heat of vaporization (thermal decomposition) may be supplied directly to the vaporizing surface by directly fired burners or the like.

Additionally, the process advantageously makes available to the catalytic reactor substantially uncontaminated isocyanic acid, a difficult if not impossible achievement when liquid urea is employed in the process of U.S. Patent 3,152,128. A cleaner reactant stream makes possible, of course, a product of higher purity.

The present process is preferably and best practiced by flash-vaporizing liquid urea in a first reactor containing stainless steel balls preheated to a temperature sufficient to decompose urea on contact. A broad temperature range for this purpose is about 200° C. to 700° C. but preferably the temperature is 400° C. to 450° C.

Any known means may be utilized to bring the first bed to operating temperature such as gas jets, superheated steam coils, electrical jackets and the like. Although rapid heating is preferred, within a period up to five seconds, preferably within one second, so as to vaporize the urea, the reactor containing the urea and non-catalytic particles may be more gradually heated, if desired.

The vaporization of the urea in the first fixed bed as described results in decomposition to isocyanic acid. Any non-volatile material is then removed by conventional means and the vaporous decomposition products are conducted through heated lines to a second reactor containing known catalytic materials for conversion to melamine. The second reactor bed may be fixed or fluidized by a gas such as ammonia or a mixture of ammonia (at least 60%) and nitrogen. Details of conversion of the vaporous urea decomposition products to melamine in a catalytic bed are well-known in the art. See for example, U.S. Patents 2,760,961 and 3,152,128.

Other heat-stable, refractory, particulate materials may be employed in place of stainless steel balls in the first reactor bed provided the resultant bed is not fluidized by the injection of liquid or solid urea and the material does not promote formation of melamine. In this latter respect, the bed material must function only as a heat-transfer agent and not as a catalyst. Thus, materials having substantial pore structure (internal surface area) should be avoided. Suitable materials therefore include metal chips or shavings, e.g., lathe scrap, silicon carbide, corundum, sand and other ceramic substances of various shapes and sizes. Metal spheres are particularly desirable since they do not tend to break up into small particles which may cause agglomeration or catalysis.

A sweeping gas is preferably employed in the first reactor to facilitate vaporization and to carry the volatilized decomposition products of urea to the second catalytic reactor. This is accomplished conveniently by admitting an ammonia stream (or like inert gas) at a rate of from about 0.3 to 4.5 moles per hour co-currently with the urea feed. A second ammonia stream is fed counter-currently at about 1.6 to 2.5 moles per hour. The total ammonia feed rate should be such as to move the urea and vaporous decomposition products rapidly through the bed but the amount and feed rate of ammonia should not be so high as to reduce the effective contact time or to fluidize the bed, particularly when smaller, less dense, heat-exchange materials are employed, such as sand. The amount of ammonia and feed rate should be sufficient generally to provide a linear gas velocity of about 0.1 to 2.0 feet per second and a contact time of about 2 to 10 seconds.

The process of the invention is particularly adapted to continuous reaction although, if desired, semi-continuous or batch procedures are also effective. The process operates efficiently at atmospheric pressure but sub-atmospheric or super-atmospheric pressures, with corresponding variation in temperature, may also be utilized. Particle size of the inert, solid material in the first, fixed, bed is not critical so long as the particles are not so small as to be easily fluidized. Where particle size is small, the bulk density of the material should be sufficiently high to avoid fluidization in the normal gas velocity range of the reactor. Gas velocity, since it is related to the geometry of the reactor, may be varied accordingly, as is known in the art.

The following examples illustrate the invention but do not limit it except as indicated in the appended claims. All parts and percentages are by weight unless otherwise specified.

EXAMPLE 1

Liquid urea is fed by a piston displacement feeder at 174.8 grams/hour to an electrically heated (450–500° C.) cracking (vaporizing) furnace, packed with ⅛ to ½ inch diameter stainless steel balls. Co-currently, ammonia (1.5 moles/hour) is passed into the ball-filled furnace. A second stream of ammonia (8.0 moles/hour) is fed counter-current to the ammonia-urea feed. A total of 15.0 moles/hour of ammonia is used, resulting in a linear gas velocity of 0.5 feet/second and a contact time of about 5.5 seconds. The urea decomposes by flash-vaporization to isocyanic acid and the resultant gas stream is led through heated lines to the bottom of a bed of fluidized silica-gel catalyst maintained at 377° C. and 1 atmosphere pressure where the acid is converted to melamine.

Thereafter, the products of reaction are separated from the catalyst fines by a fiber glass filter in the heated knockout section of the reactor. The melamine in the ammonia gas stream is collected by cooling the stream to 50–100° C. and filtering through a stainless steel filter. In this manner, 42.7 grams of crude product are obtained, containing 32.1 grams of melamine and 10.6 grams of urea. The melamine can be recovered in a high degree of purity by recrystallization from water.

EXAMPLES 2–5

In substantially the same manner as in Example 1, liquid urea is flash-vaporized in a fixed bed of stainless steel balls, the vaporous decomposition products, principally isocyanic acid, then being converted in a second catalytic reactor to melamine. Table I below describes conditions and melamine yields for four runs. No agglomeration problems are encountered in Examples 1–5 although liquid urea is employed. The process operates with substantially the same efficiency when solid (e.g., powdered) urea is injected into the vaporizer.

TABLE I

|  | Examples | | | |
|---|---|---|---|---|
|  | 2 | 3 | 4 | 5 |
| Urea Vaporizer, Temp. °C | 471–538 | 477–543 | 454–488 | 470 |
| Fluid Reactor, Temp. °C | 377 | 377 | 377 | 380 |
| Urea, Feed, grams | 172.9 | 172.9 | 174.8 | 172.0 |
| Melamine, Crude, grams | 12.1 | 16.6 | 42.7 | 22.7 |
| Melamine Analysis, percent | 69.0 | 71.0 | ca. 75 | ca. 75 |
| Urea in product | 25.0 | 22.3 |  |  |
| Yield [1] | 15.1 | 25.4 | 52.4 | 28.0 |
| Percent organic material on catalyst at end of run |  | 11.3 | 12.1 | 9.6 |

[1] Calculated as follows:
$$\text{Yield} = \frac{\text{Crude Melamine} \times \text{Melamine Content} \times 100}{(\text{Urea Feed} - \text{Urea Content of Crude}) \times .35}$$

I claim:
1. A process for the production of melamine comprising introducing urea and a sweeping gas stream into a fixed, substantially catalyst-free bed of heated, inert solid particles, said temperature being sufficient to thermally decompose said urea on contact and said gas stream having a linear velocity less than that required to fluidize said bed, removing the resulting decomposition products from said bed and reactively contacting said products with the catalyst.
2. The process of claim 1 wherein said linear velocity is in the range of 0.1 to 2.0 feet per second.
3. The process of claim 1 wherein said inert, solid particles are stainless steel balls.
4. The process of claim 1 wherein said thermal decomposition is effected by flash vaporization of the urea.
5. The process of claim 1 wherein the urea subjected to thermal decomposition is a liquid.

References Cited

Tiselius et al. (Ed.): "The Svedberg," Almqvist and Wiksells, Pub., Uppsala, Sweden (1945), pp. 344–51.

JOHN D. RANDOLPH, *Primary Examiner.*

W. A. MODANCE, *Examiner.*

J. M. FORD, *Assistant Examiner.*

Dedication 3,377,349. —*Samuel William Tribit,* Hawthorne, N.Y. PREPARATION OF MELAMINE. Patent dated Apr. 9, 1968. Dedication filed Mar. 4, 1983, by the assignee, *American Cyanamid Co.*

Hereby dedicates the remaining term of said patent to the Public.
[*Official Gazette May 31, 1983.*]